United States Patent [19]

Ogura et al.

[11] Patent Number: 4,611,909

[45] Date of Patent: Sep. 16, 1986

[54] MAGNIFICATION SELECTABLE IMAGE FORMING APPARATUS

[75] Inventors: Masahiko Ogura, Fujisawa; Hideshi Oushiden, Kawasaki, both of Japan

[73] Assignee: Kabushiki Kaisha Toshiba, Kawasaki, Japan

[21] Appl. No.: 625,794

[22] Filed: Jun. 28, 1984

[30] Foreign Application Priority Data

Jul. 6, 1983 [JP] Japan ............................... 58-123012

[51] Int. Cl.[4] ....................... G03B 27/34; G03B 27/40

[52] U.S. Cl. ......................................... 355/56; 355/55

[58] Field of Search .................................... 355/55, 56

[56] References Cited

U.S. PATENT DOCUMENTS

| | | | |
|---|---|---|---|
| 3,335,636 | 8/1967 | Atkinson | 355/56 |
| 4,080,062 | 3/1978 | Torigai et al. | 355/49 |
| 4,372,676 | 2/1983 | Miyata et al. | 355/55 |
| 4,512,655 | 4/1985 | Ishida et al. | 355/55 |

FOREIGN PATENT DOCUMENTS 2856640 7/1979 Fed. Rep. of Germany .

*Primary Examiner*—Monroe H. Hayes

*Attorney, Agent, or Firm*—Cushman, Darby & Cushman

[57] ABSTRACT

An image forming apparatus with a function to set the magnification of an image to be formed, including an input section for inputting a magnification of an image to be formed, a drive member for setting the magnification input by the input section so as to provide an image at the magnification, and a microcomputer coupled to the input section and designed to control the drive member in such a manner that the drive member sets the magnification input by the input section when no additional magnification is input within a predetermined period after the magnification has been input, and sets the additional magnification when no further additional magnification is input within another period after the additional magnification has been input, and so forth.

10 Claims, 8 Drawing Figures

MAGNIFICATION SELECTABLE IMAGE FORMING APPARATUS

BACKGROUND OF THE INVENTION

The present invention relates to an image forming apparatus of the type which copies an original at a desired magnification.

An example of the known image forming apparatus of this type is a copy machine with an enlargement/reduction function. For making clearer the disadvantages of the prior art and objects of the present invention, the principles of the copy machine with such a function will be given referring to FIG. 1.

An original Q is optically scanned by a scanning section 2 when the section 2 moves along an exposure table 1 in the arrow directions N. The scanning section 2 is provided with an exposure lamp 3 and a mirror 4. The light, reflected from the original Q when it is illuminated by the exposure lamp 3, is led to a photosensitive drum 8 through a group of mirrors 4 to 7. Disposed between the mirrors 6 and 7 is a lens 9 for variably setting the magnification of a picture of the original Q. The photosensitive drum 8, as previously charged, has an electrostatic latent image formed thereon when it is illuminated with light containing the image information. The latent image is developed with toner particles and transferred onto a paper P as fed thereto. In this way, a picture of the original Q is copied on the paper.

The magnification of an image size, as viewed in the scanning direction, is determined by a ratio (speed ratio) of a scanning speed (moving speed) of the scanning section 2 and a rotating speed of the photosensitive drum 8. A magnification of the image size, as viewed in the direction normal to the scanning direction, is determined by a ratio (optical path ratio) of the lengths of the optical paths between the original Q and the lens 9 and between the lens 9 and the photosensitive drum 8. For selecting a desired magnification of the image size, a magnification setting means is operated to properly set the speed ratio and the optical path ratio. Specifically, the magnification setting means contains a speed-ratio setting means for the moving speed of the scanning section 2 and the rotating speed of the photosensitive drum 8, and contains an optical-path ratio-setting means for changing an initial position of the lens 9 to change a length of the optical path.

In the prior art copy machine, upon inputting a desired magnification into the machine, the magnification setting means starts its operation to drive the speed-ratio setting means and the optical-path ratio-setting means. With the completion of a sequence of operations, a magnification setting operation terminates. One frequently encounters a case that an operator mistakenly inputs an undesired magnification, and soon after its setting discovers it to be undesirable. In such a case, if a desired magnification is input immediately after he discovers the mistake, the copy machine rejects the input of the new magnification until the sequence of the magnification setting operations is completed. Particularly, the optical-path ratio-setting means must be operated gently to such an extent as to give a tolerable impact to the optical system contained in the machine. Therefore, its operation takes a relatively long time.

Thus, the prior art copy machine inevitably takes a long operation time when a magnification, once set, must be reset to another magnification immediately after the old magnification has been set.

SUMMARY OF THE INVENTION

Accordingly, an object of the present invention is to provide an image forming apparatus requiring a short operation time when a magnification, once set, is reset to another magnification immediately after a previous magnification.

According to one aspect of the invention, there is provided an image forming apparatus with a function which sets the magnification of an image to be formed, comprising: input means for inputting a magnification of an image to be formed; control means, coupled with said input means, for providing commands to set a magnification as input by said input means, and which, when a magnification is input by said input means, accepts an additional magnification input by said input means within a given period of time and provides commands for setting the input magnification only when no additional magnification is input within the given period, and when an additional magnification is input, accepts another additional magnification input by said input means within a further given period of time; and magnification setting means driven under the control of the commands by said control control means so as to provide an image at the input magnification.

With such an arrangement, the image forming apparatus waits for a predetermined period of time after a first magnification is input and allows a magnification setting means to operate after the predetermined period only when a second magnification is not input within the waiting period. Therefore, a new magnification can quickly be set.

Further, a fine magnification setting is possible. For example, an operator consecutively inputs magnification values of, for example, 120%, 121%, 122%, . . . , 126%. At the same time, the apparatus displays the same values in a successive manner. Seeing the changing magnification values as displayed, the operator stops the input operation when a desired magnification value, for example, 126%, is reached. 126% as finally input is set, as the desired magnification, into the apparatus.

DETAILED DESCRIPTION OF THE PREFERRED EMBODIMENTS

Figure 1:
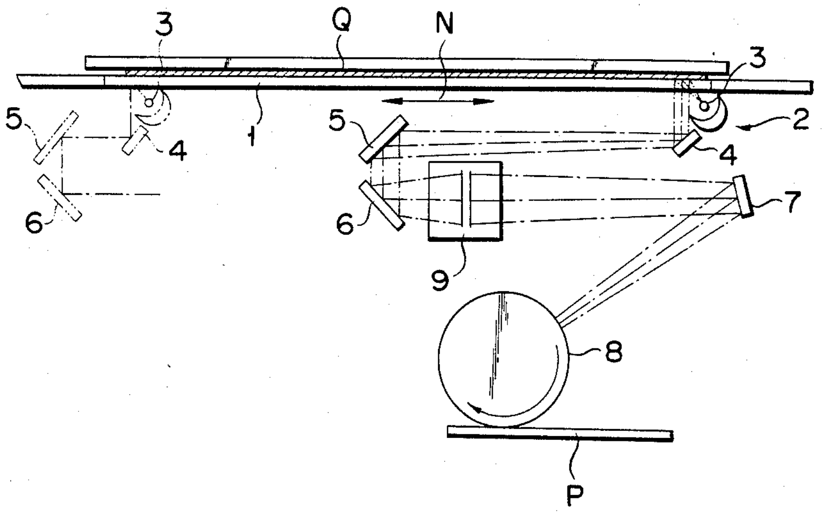
FIG. 1 is a schematic illustration of a magnification setting mechanism in a copy machine.
Figure 2:
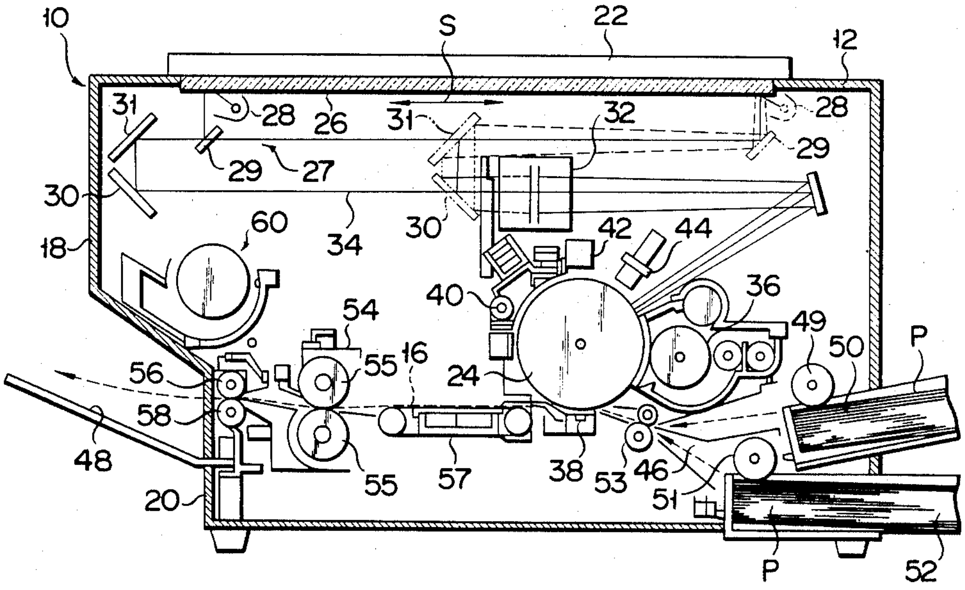
FIG. 2 illustrates a longitudinal cross sectional view of a copy machine according to an embodiment of the present invention.

An embodiment of a copy machine of the present invention will be described referring to FIGS. 2 to 8.

As shown, a copy machine 10 contains a body 12 with a magnification setting function as will be described later in detail. The magnification setting function provides an enlargement or a reduction of an image to be copied. The body 12 is divided into two sections with respect to a transfer path 16, as indicated by a broken line, and along which paper P is transported. These sections are named and denoted as upper and lower units 18 and 20, respectively. The problem of jamming tends to occur on the transfer path 16. For easy removal of the jam, the upper and lower units 18 and 20 are separated, for example, by hinges. Further, the upper unit lies substantially flush with the separating boarder line so that it is quickly accessed. A cover 22 for immovably holding an original (not shown), as set for copy, is mounted to the top of the body 12 in a hinged manner, for example. A photosensitive drum 24 is rotatably situated substantially at the center in the body 12. When illuminated with light containing image information, a latent image is formed on the surface of the photosensitive drum 24. An exposure table 26 on which an original is placed is situated between the photosensitive drum 24 and the cover 22. Further located between those components is a scanning unit 27 which moves in the directions of double-headed arrow S to optically scan the original on the exposure table 26. The scanning section 27 is provided with an exposure lamp 28 and a first mirror 29 for reflecting light coming from the exposure table 26. An optical path system 34 is further provided for directing the light from the first mirror 29 toward the photosensitive drum 24. The optical path system 34 contains second mirrors 30 and 31 and a lens unit 32, which constitute a magnification setting means and are movable in the direction indicated by the double-headed arrow S. The minors 30 and 31 and the mirror unit 32 are associated with a positioning mechanism (an optical-path ratio-setting means) 80 which partially constitutes the magnification setting means and will be described later. The positioning machanism operates to position the mirrors and the lens unit according to the magnification to be set. The scanning unit 27 and the photosensitive drum 24 are provided with a drive mechanism (a speed ratio setting means) 101, which is also part of the magnification setting means. The drive mechanism 101, in the exposure step of the copying cycle, operates to drive the scanning section 27 and the photosensitive drum 24. The moving and rotating speeds of the scanning unit 27 and the photosensitive drum 24 depend on the magnification to be set.

A developing unit 36, a transfer unit 38, a cleaning unit 40, a quenching unit 42, and a charger 44 are successively arranged around and close to the outer periphery of the photosensitive drum 24, while being angularly spaced apart from one another. The developing unit 36 applies toner particles onto the surface of the photosensitive drum 24 to develop an electrostatic latent image formed thereon. The transfer unit 38 transfers the toner image onto a paper. The cleaning unit 40 removes toner particles on the photosensitive drum 24 to clean the drum surface. The quenching unit 42 quenches the latent image on the drum surface. The charger 44 charges the drum surface.

The transfer path 16 begins with a paper feeder 46 at the right end of the lower unit 20 as viewed in the drawing and terminates at a paper tray 48 provided at the other end thereof. The paper feeder 46 is designed so as to receive cassettes 50 and 52 containing sets of papers P. Feed rollers 49 and 51 are respectively provided in association with the cassettes 50 and 52 to feed the papers, sheet by sheet, to an aligning roller pair 53. The aligning roller pair 53 is situated between the paper feeder 46 and the photosensitive drum 24 and aligns the leading edge of the paper P, as fed from the paper feeder 46, and feeds it toward the photosensitive drum 24. A transport section 57 is placed between the photosensitive drum 24 and a fixing or fusing unit 54 and transfers the paper P fed from the photosensitive drum 24 to the fixing unit 54. Disposed in the end portion of the transfer path 16 are the fixing unit 54, containing a pair of rollers 54 and fusing toner particles of the toner image onto the paper P, and a pair of exit rollers 56 and 58.

Figure 6:
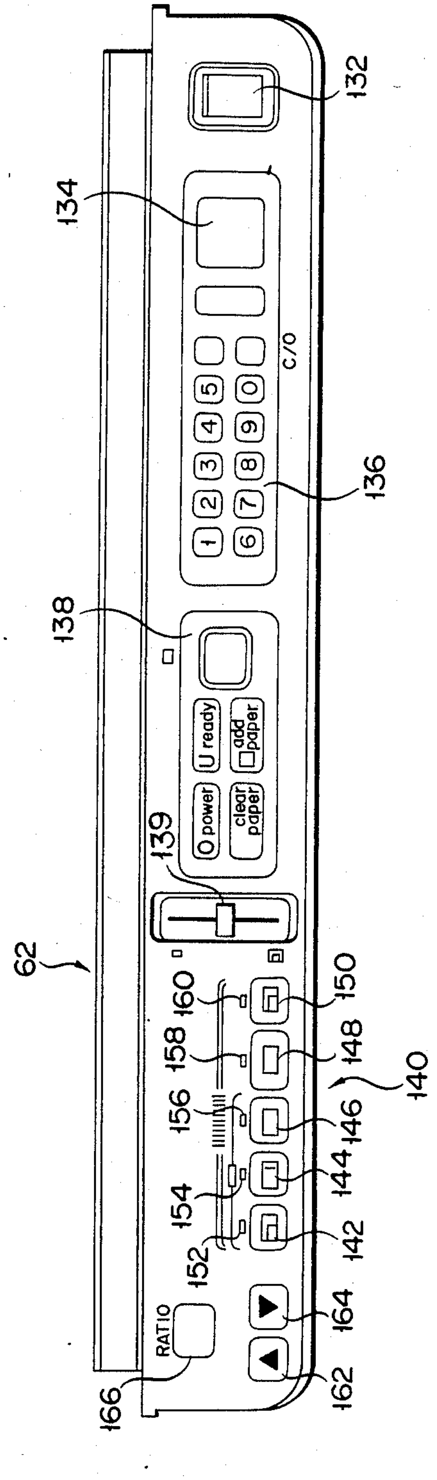
FIG. 6 is a plan view of an operation panel of the copy machine shown in FIG. 1.

A control panel 62 to input various commands to control the copy machine 10 is provided on the top of the copy machine 10 (FIG. 6).

SCANNING SECTION 27 & OPTICAL PATH SYSTEM 34

Figure 3:
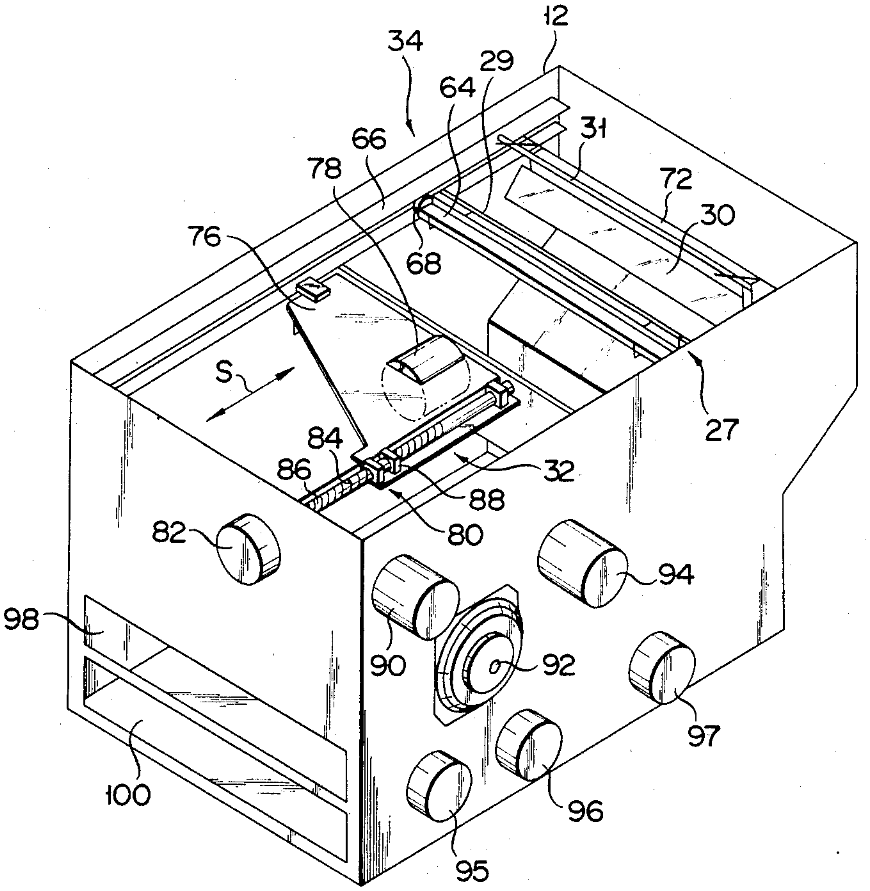
FIG. 3 is a perspective view illustrating an exposure system used in the machine shown in FIG. 2.
Figure 4:
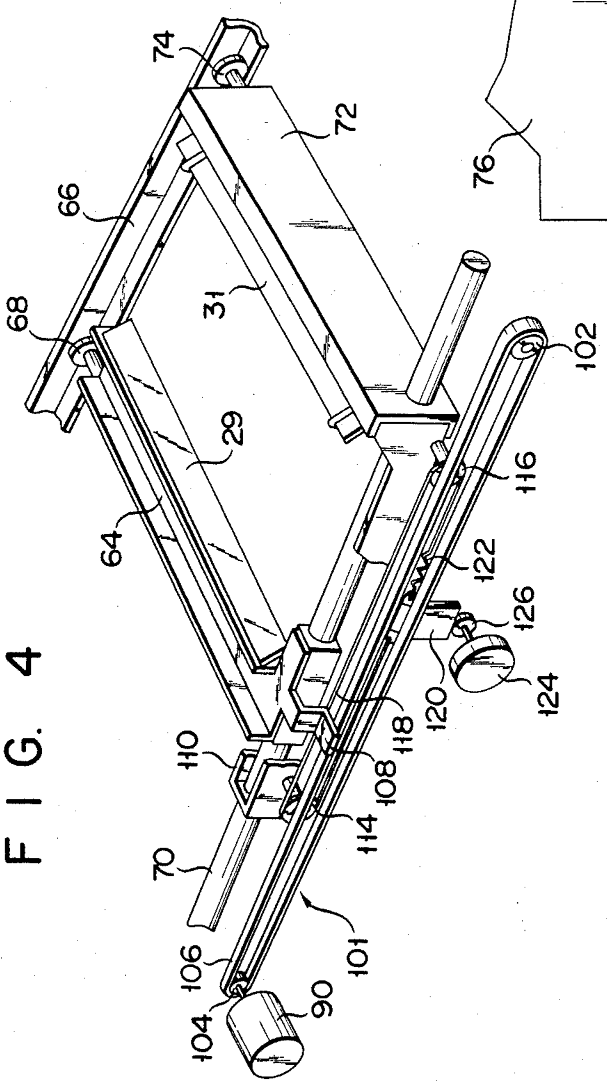
FIG. 4 is a perspective view illustrating a drive mechanism for driving a group of mirrors in the exposure system shown in FIG. 3.
Figure 5:
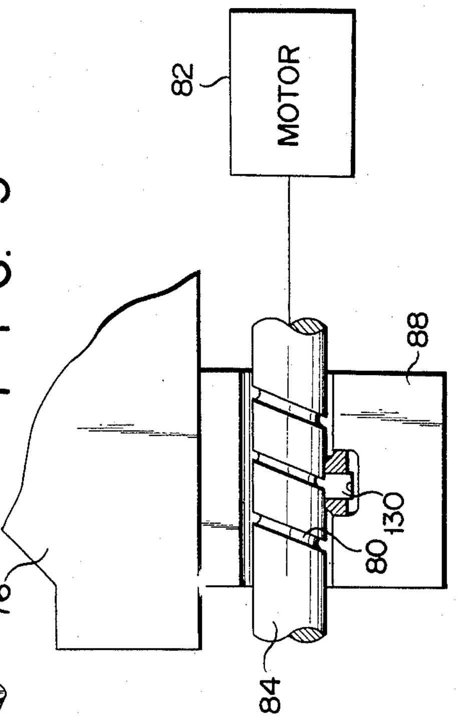
FIG. 5 is a side view illustrating the mirror group drive mechanism of FIG. 3.

Reference is mainly made to FIGS. 3 and 4. The scanning section 27 contains a first carriage 64, holding a first mirror 29, and an exposure lamp 28. The first carriage 64 is disposed across the body 12 in the width direction thereof. A guide rail 66, extending in the longitudinal direction of the body 12, guides the first carriage 64 in the directions of the arrow S. The first carriage 64 moves along the guide rail 66 with a wheel 68 mounted to one end of the first carriage 64. The other end of the first carriage 64 is slidably fitted around a rod like rail 70 which is disposed substantially in parallel with the guide rail 66, as shown in FIG. 4. The optical path system 34 contains a second carriage 72 for holding the second and third mirrors 30 and 31. The second carriage 72 is disposed substantially parallel with the first carriage 64. A second wheel 74, provided on one end of the second carriage 72, is for moving the second carriage 72 along the guide rail 66. The other end of the second carriage 72 is slidably fitted around the block 76.

The lens unit 32 contains a block 76 with a lens group 78 fixed thereto. One end of the block 76 is slidably supported by the guide rail 66, while the other end is provided with a positioning mechanism 80 for moving the block 76 in the directions of the arrow S and for accurately positioning it at a desired point. The spiral groove 86 is constructed of a combination of a cam shaft and a spiral groove, which will subsequently be described.

Mounted on one of the side walls of the body 12 are a second motor 90 for correlatively driving the first carriage 64 and the second carriage 72 in the optical path system 34, and a third motor 92 for rotating the photosensitive drum 24. Further mounted on the side wall are a fourth motor 94 for driving the developing unit 36, a fifth motor 95 for driving the feed rollers 49 and 51, a sixth motor 96 for driving the aligning roller 53, and a seventh motor 97 for driving the pair of exit rollers 56 and 58. Openings 98 and 100 are formed on another side wall adjacent to and directed normal to the motors mounted on the side wall of the body 12.

Drive Mechanism 101

Reference is made to FIG. 4 best illustrating a drive mechanism 101 for driving the first carriage 64 for the scanning unit 27 and the second carriage 72 for the optical path system 34.

A first pulley 102 is located adjacent to the rod like rail 70. The second motor 90 is connected through a motor shaft to a drive pulley 104. A drive belt 106 is wound around the pulleys 102 and 104 while stretching substantially parallel with the guide rail 66. An L-shaped projection 108 projects from the end of the first carriage 64 toward the drive belt 106 and is fixed to the drive belt 106 as shown. With this arrangement, the second motor 90 runs to move the first carriage 64 along the guide rail 66. An extended portion 110, which is integral with the second carriage 72, extends in the direction opposite to the second carriage 72. A second pulley 114 is mounted to the side of the extended portion 110 while being directed to the drive belt 106. A drive belt 106, mounted to the end of the second carriage 72, is also directed to the drive belt 106. Those pulleys 114 and 116 are wound by a wire 118 which is also connected to the L-shaped projection 108 of the first carriage 64 and has a combination of a fixed member 120, fixed to the body 12, and a spring 122 contained in the wire loop. With this arrangement, when the first carriage 64 moves and in turn the wire 118 is pulled through the L-shaped projection 108, the second and third pulleys 114 and 116 serve as running blocks. Therefore, the second carriage 72 runs at half the speed of the first carriage 62. When the second carriage 72 moves, the spring 122 buffers the drive force applied to the second carriage 72. Since a pulse motor is used for the second motor 90, the direction of and an amount of the movement of the first and second carriages 64 and 72 are controlled properly.

A rack is formed on the bottom end of the fixed member 120 as viewed in the drawing. A pinion 126 is fixed to the shaft of an eighth motor 124 as one of the components of the magnification setting means. The pinion 126 is in mesh with the rack of the fixed member 120. Upon setting of a desired magnification, this mechanism enables the eighth motor 124 to move only the second carriage 72 to an initial point as determined according to the set magnification.

Those motors 90 and 124 contained in the drive mechanism 101, which are coupled to a magnification control section 161 to be given later, have respectively rotating speeds under the control of the magnification control section 161 for effecting a control operation according to a magnification as set.

Positioning Mechanism 80

The positioning mechanism 80 contains a cam follower 88 with a projection 130, which is fixed to the block 76, and a cam shaft 84 with a groove 86 spirally formed thereon, which is contiguous to the shaft of the first motor 82. With rotation of the first motor 82, the cam shaft 84 rotates to move the block 76 forward or backward, thereby to accurately set the lens group 78 at a position determined according to a magnification as set. The first motor 82, which is electrically wired to the magnification control section 161, rotates under the control of a command signal issued from the magnification control section 161, thus guaranteeing an accurate positioning of the lens group 78.

Control Panel 62

Reference is made to FIG. 6 for explaining the control panel 62 which inputs various commands for the operation of the copy machine 10. A main switch 132, located on the right-end portion of the control panel 6 as viewed in the drawing, feeds or stops the power supply to the copy machine 10. A start or print button 134 to start the print operation is located near the main switch 132. A ten key group 136 is for inputting the number of copies. A display window 138 is for visually displaying the number of copies as input and for visually informing the copy run. A knob 139 for density adjustment is slidably moved along a scale indicating the copy density. A magnification setting section 140 contains select buttons for magnifications, for example, 70%, 80%, 110%, 120% and 150%, which are respectively denoted as 142, 144, 146, 148 and 150. Lamps 152, 154, 156, 158 and 160 are located in association with and near the select buttons just mentioned, respectively. The lamp lights up when the select button associated therewith is pushed. The select buttons are electrically connected to the magnification control section 161. Two fine magnification setting buttons 162 and 164 for image enlargement and reduction, which are also connected to the magnification control section 161, are provided in association with a display window 166. These buttons can finely set a desired magnification. When the button 162 is pushed, a magnification value is incremented from 100% at the step of 1%. Pushing of the select button 164 decrements a magnification value by 1% step by step. The incrementing or decrementing values are dynamically displayed by the display window 166. When the pushing of either of the select buttons is continued for a predetermined period of time, for example, 1 second, an input speed of the magnification values is accelerated to 10%/sec., for example. If, within a predetermined period of time, for example, 3 seconds, after pushing the button stops and another pushing occurs, the magnification value displayed when the pushing has stopped is set as a desired magnification value.

Magnifciation Control Section 161

Figure 7:
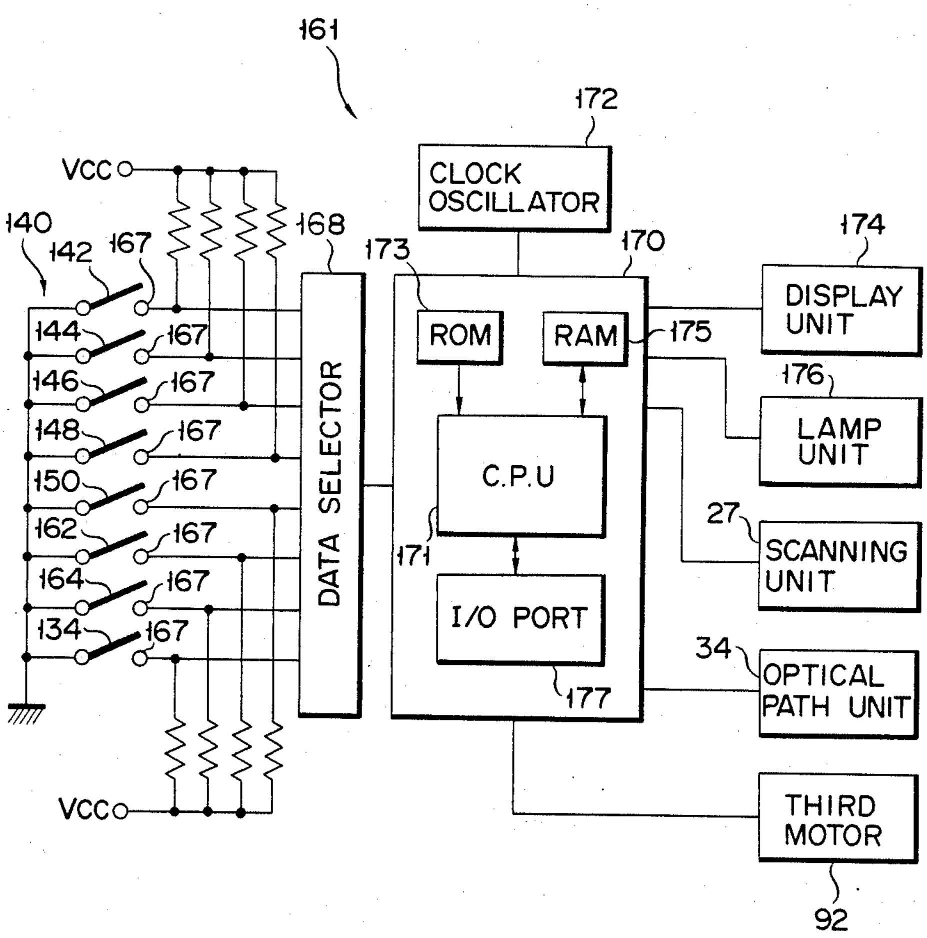
FIG. 7 shows a functional diagram of a control system in a magnification setting mechanism according to the embodiment of the present invention.

A configuration of the magnification control section 161 for controlling the magnification setting mechanism will be described referring to FIG. 7.

In the magnification control section 161, the magnification setting section 140 contains a group of switches forming the magnification select buttons 142 to 150, the magnification setting buttons 162 and 164, and the start button 134. The fixed contacts 167 of these switches are connected respectively through resistors to a power source Vcc and to a data selector 168. When one of the buttons is pushed, the corresponding switch is closed to ground the electrical path, ranging from its switch contact to the data selector 168. As a result, a negative voltage appears on the electrical path. The data selector 168 detects the negative voltage and applies it to a microcomputer 170 containing a central processing unit (CPU) 171, a read only memory (ROM) 173, a random access memory (RAM) 175, and an input/output (I/O) port 177. The microcomputer 170 properly computes on the basis of the detected negative voltage from the data selector 168 and issues command signals to the associated units to be referred to later. The microcomputer 170 may be an 8-bit microcomputer of Model 8051, manufactured by Intel Inc., U.S.A. A clock oscillator 172 for time control is coupled with the microcomputer 170. The ROM 173 supplies the intake signal to the data selector for intaking the input signal from the data selector. When a second input for changing a magnification occurs within a predetermined period of time, for example, 3 seconds, the microcomputer 170 resets to zero the count of the clock signal thus far made and restarts the counting for the time control. The RAM 175 supplies the necessary data to the CPU when the microcomputer 170 accepts the input signal thereto and performs a logic operation on the basis of the input. The I/O port 177 sends to the related units control signals resulting from the arithmetic operation by the CPU. The microcomputer 170 is further connected to a display unit 174 containing the display window 138 for displaying a magnification as properly set, a lamp unit 176 containing the lamps 152, 154, 156, 158 and 160, the scanning unit 27 containing the second motor 90, an optical path unit 34 containing the lens unit 32 and the second carriage 72, and the third motor 92 for rotating the photosensitive drum 24 at a predetermined speed. Those units and the motors are controlled by the control signals produced by the microcomputer 170.

Figure 8:
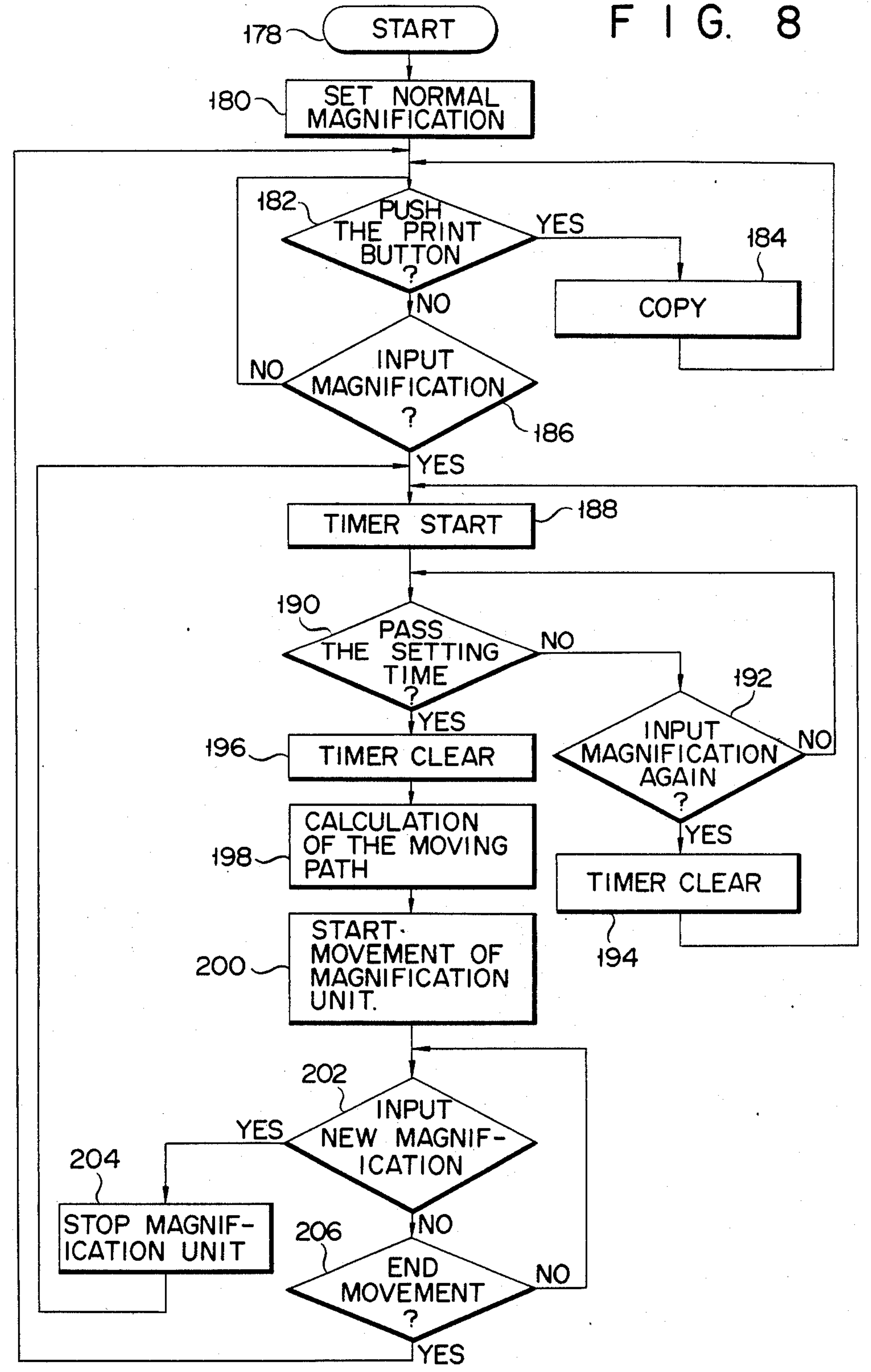
FIG. 8 shows a flow chart illustrating a copying operation by the magnification setting mechanism of the copy machine shown in FIG. 2.

The control operation of the copy machine 10 will be described referring to FIG. 8.

In a first step 178, the main switch 132 is turned on. Then, in the next step 180, the start or print button 134 operates to move the lens unit 32 to a normal magnification position. In a third step 180, it is checked whether or not the start button 134 is pushed. If it is pushed, that is, if the check result is "YES," a fourth step 184 is executed. In the fourth step 184, the machine starts its copying operation of an original. More specifically, upon receiving a start signal from the microcomputer 170, the scanning unit 27, the optical path system 34, and the third motor 92 are operated. When the print button 134 is not pushed, that is, when the check result is "NO," a fifth step 186 is executed.

In this step, it is checked whether or not one of the magnification select buttons 142 to 150 or the magnification up or down button 162 or 164 is pushed. When none of the buttons are pushed, that is, when the judgement is "NO," the CPU 170 returns to the third step 180. When one of the buttons is pushed, viz., when the judgement is "YES," a sixth step 188 is executed.

In this step, as the timer the CPU 171 counts a predetermined time with the clock signal produced from the clock oscillator 172. Then, the processing by the microcomputer 170 flows to a seventh step 190.

In this step, it is judged whether or not the predetermined period has elapsed from the start of the time counting in the sixth step. When the predetermined time has not been reached, for example, only 2 seconds passes, that is, when the judgement is "NO," an eighth step 192 is executed. This step is for seeing if another magnification is input again. If no input of another magnification is done, that is, if the judgement is "NO," the CPU returns to the seventh step 190. When another magnification is set, that is, when the judgement is "YES," the CPU advances to a ninth step 194. In this step, the timer is cleared and then the sixth step 188 is executed again.

In the seventh step 190, when about 3 seconds have passed, that is, when the judgement is "YES," a tenth step 196 is executed.

In this step, the timer is cleared. Subsequently, the CPU executes an eleventh step 198. This step is for calculating moving paths of the lens unit 32 and the second carriage 72, viz., a distance from the present positions of those components to the initial positions as given by a magnification finally set by the related button. Then, the microcomputer 170 proceedes to a twelfth step 200. This step causes the lens unit 32 and the second carriage 72 to start the movement of the moving paths calculated in the eleventh step. Then, the microcomputer 170 goes to a thirteenth step 202 where it is judged whether or not a new magnification is set. If the new magnification is set, that is, if the judgement is "YES," a fourteenth step 204 is executed to stop the movement of the lens unit 32 and the second carriage 72 at their initial positions. Then, the magnification setting process returns to the sixth step 188. If no input of a new magnification has been done, a fifteenth step 206 is executed.

In this step, it is judged whether or not the movement of the lens unit 32 and the second carriage 72 to their initial positions has ended. When those components are moving, that is, when the judgement is "NO," the thirteenth step 202 is executed again. When their movement ends, the third step 180 is again executed.

In the present invention, after one of the magnification select or setting buttons is pushed, the microcomputer checks to see whether or not another button has been additionally pushed within the predetermined period of time. If the check result is "NO," the lens unit 32 and the second carriage 72 are moved according to the magnfication as set. When a magnification is additionally set within that time period, the timer is cleared and restarts the counting of the predetermined time. Thus, in setting a desired magnification, the magnification setting mechanism containing the lens unit 32 and the second carriage 72 is at a standstill for a predetermined period of time. If another magnification is input within the predetermined period, the timer again starts counting the time from the point of the occurence of the new magnification, and after that time period, the magnification setting mechanism is operated. Therefore, when an operator mistakenly sets an undesired magnification and soon after discovers it to be undesired, it can be corrected to the desired one more quickly than the prior art, in which the machine does not accept the setting of a new magnification until a sequence of the magnification setting operation is completed.

Further, the copy machine of the present invention allows magnifications to be consecutively set before the magnification setting mechanism operates. Because of this feature, the magnification may be consecutively and finely set in units of 1%. for example.

Furthermore, in a case where a new magnification is set after the predetermined period, the timer restarts counting time from the point of setting the new magnification, in preparation for setting another magnification, while the movement of the magnification setting members toward their initial positions is stopped. Therefore, the new magnification can quickly be set before the movement of the magnification setting members has been completed.

It should be understood that the present invention may be changed and modified in various ways within the scope of the present invention.

While the copy machine has been described, the invention is applicable for any other suitable apparatuses with a magnification select function, for example, a thermal printer. Further, the above-mentioned embodiment employs two types of magnification input buttons: the magnification select buttons and the magnification setting buttons. It is evident, however, that the present invention may be reduced to practice with use of either of the two types of buttons. Further, 3 seconds for the predetermined period of time may be changed to any value, if required.

What is claimed is:

1. An image forming apparatus which sets the magnification of an image to be formed, comprising:

input means for inputting magnifications of an image to be formed;

magnification setting means for setting a selected magnification input by said input means so as to provide an image at the magnification; and control means coupled to said input means for controlling said magnification setting means in such a manner that said magnification setting means sets the selected magnification input by said input means, said control means including: (a) counting means for counting a time interval, initiated in response to input of said selected magnification by said input means, and ended by any one of reaching a predetermined time interval and input of another magnification by said input means; and (b) comparator means for comparing said counted time interval to said predetermined time interval and for setting said another magnification only when said counted time interval is shorter than said predetermined time interval.

2. The apparatus according to claim 1, wherein said control means includes a means for stopping the drive of said magnification setting means when another magnification is input after the drive of said magnification setting means starts.

3. The apparatus according to claim 1, wherein said control means includes a means for making a calculation of the shortest possible distance between a position where said magnification setting means is stopped and a position of said magnification setting means corresponding to said magnification input after the drive of said magnification setting means starts, and said magnification setting means is moved according to the results of said calculation.

4. The apparatus according to claim 3, wherein said image forming apparatus is a copy machine to copy an original, and said magnification setting means includes a lens unit movably provided in an optical path system for the original, a first drive mechanism for driving said lens unit, a rotatable photosensitive drum for providing a latent image of the original, and a second drive mechanism for changing a rotating speed of said photosensitive drum.

5. The apparatus according to claim 1, wherein said input means includes buttons for setting predetermined magnifications.

6. The apparatus according to claim 1, wherein said input means includes means for incrementing a stepwise magnification and means for decrementing the stepwise magnification.

7. The apparatus according to claim 6, wherein said incrementing and decrementing means are respectively provided with up and down buttons for incrementing and decrementing a magnification at a step of 1%.

8. The apparatus according to claim 7, wherein said incrementing and decrementing means includes a means which, while being pushed during a predetermined period, increases and decreases a magnification at a relatively high rate.

9. The apparatus according to claim 1, wherein said image forming apparatus includes a display unit for visually displaying a magnification as input, said display unit being connected to said control means.

10. The apparatus according to claim 1, wherein said control means includes a microcomputer.

* * * * *